Aug. 20, 1957     I. E. COFFEY     2,803,265
CHECK VALVE DEVICE
Filed July 23, 1951     2 Sheets-Sheet 1
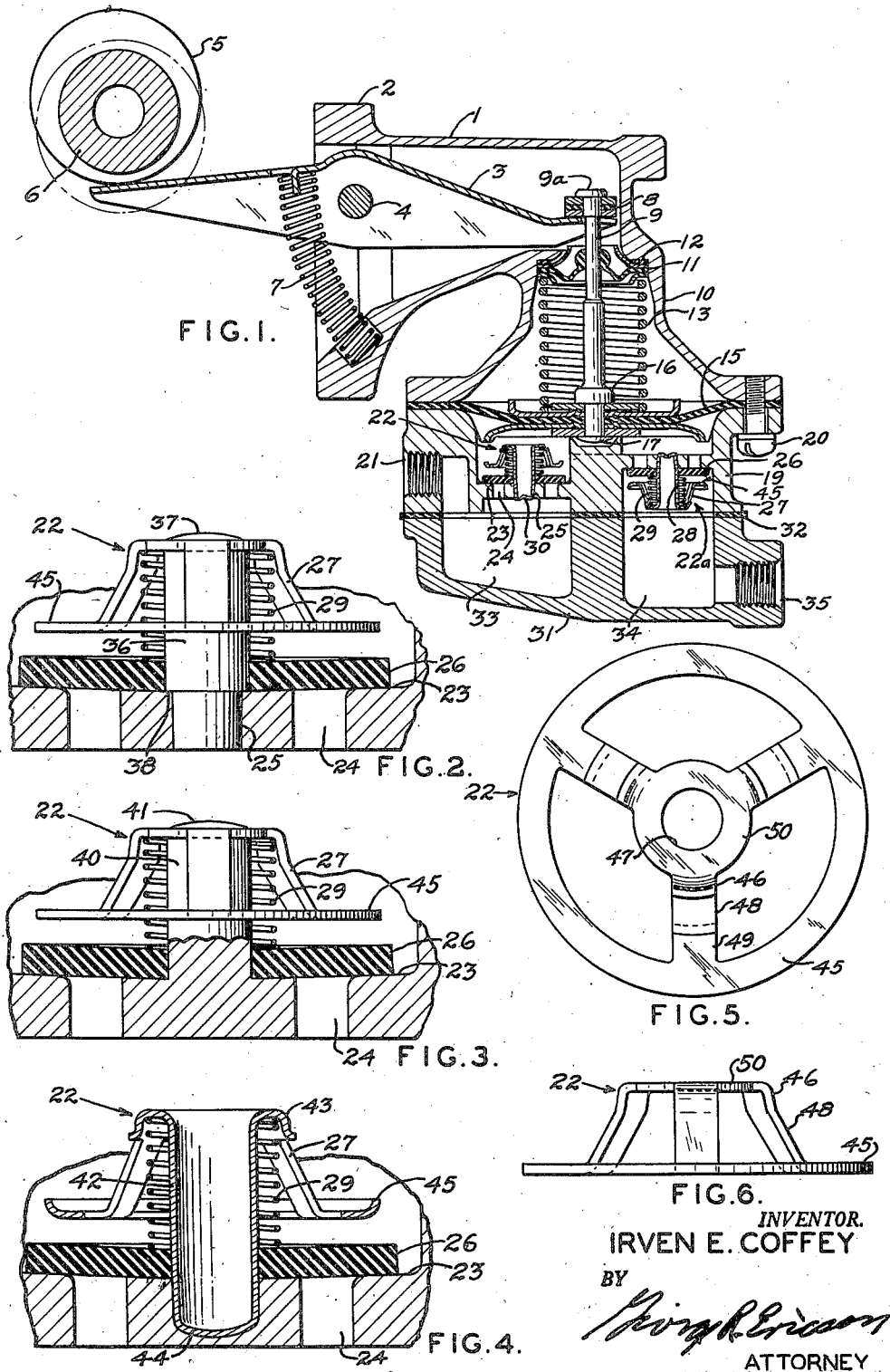
INVENTOR.
IRVEN E. COFFEY
BY
ATTORNEY Aug. 20, 1957     I. E. COFFEY     2,803,265
CHECK VALVE DEVICE Filed July 23, 1951     2 Sheets-Sheet 2

*INVENTOR.*
IRVEN E. COFFEY
BY
ATTORNEY

United States Patent Office 2,803,265
Patented Aug. 20, 1957

2,803,265

CHECK VALVE DEVICE

Irven E. Coffey, Clayton, Mo., assignor, by mesne assignments, to ACF Industries, Incorporated, New York, N. Y., a corporation of New Jersey Application July 23, 1951, Serial No. 238,130

1 Claim. (Cl. 137—516.21)

This invention relates to valve devices, particularly of the type used in liquid fuel pumps, vacuum boosters, or the like, such as generally employed in automotive practice. The valves used in previous pumps have not been entirely satisfactory because of their inability to handle mixtures of gases and liquids, a characteristic in fuels at high temperatures.

Another frequent souce of trouble has arisen from the wearing of the valves and seats, so that the pump will not prime itself at low engine cranking speed. Valves of this type must be capable of not only satisfactory operation at such low speeds, but also when operating at frequencies of at least 2000 cycles per minute. Under the latter circumstances the pump valves are opened and closed with such great rapidity that due to impact, excessive wear takes place on both the inlet valve and the outlet valve, and their respective seats. Attempts have been made, some more or less successful, to design valves limited in travel to limit in turn the impact of closing on the seat, at higher frequencies, and yet provide a full opening to facilitate pump priming at cranking speed, quick closing without undue impact, and proper seating at all speeds. According, this invention relates to a valve stop member which, although limiting valve travel, does not restrict the flow around the valve or through the valve port, and to a valve which is light in weight and capable of some flexing to accommodate low rates of flow or to conform with its seat. The invention also relates to a novel type of seat for the valve, with which the valve engages in a progressive manner in order to damp closing impact.

An object of the invention is to provide a new and improved check valve device of the type capable of functioning satisfactorily at low and high speeds.

An object of the invention is to provide a new and improved check valve device with a guide supported valve travel stop which is located within the periphery of the valve porting so as not to interfeer with flow.

An object of the invention is to provide a new and improved check valve which is simple, efficient and easily assembled in the pump.

An object of the invention is to provide a valve and a mushroom-shaped guide and valve stop which is capable of more efficient action and yet is simple in design and assembly.

An object of the invention is to provide a valve with a dish-shaped valve seat and valve of flexible material, preferably non-metallic, thereby providing means to initially seat the valve at the periphery.

Another object of the invention is to produce a valve device engageable with its seat in such a manner as to be capable of sustaining its high sealing qualities under long use, and under high speed operating conditions.

Another object of the invention is to provide a valve of such light weight and of such small valve travel as to be capable of sustained use under extremely adverse conditions with vapor pressure present in the system.

Another object of the invention is to provide a valve body or chamber and its cooperating disk check valve with complementary shaped rounded contours to decrease the resistance to fuel flow into and out of the valve body.

Another object of the invention is to provide a ring-shaped disk check valve having internal and external peripheral seating surfaces to accommodate distinctly different valve actions.

Another object is to provide a valve seat construction upon which the valve disk can be tested for its sealing action before assembly of the valve stop.

Another object of the invention is to provide a valve stop device of skeleton form with openings directly over the valve disk, so that the valve disk may be pressed to its seat by pulsations created in the fluid by action of the pump.

Other objects will appear as the description proceeds.

Referring to the accompanying drawings:

Fig. 1 is a sectional elevation of an automotive fuel pump embodying one form of the novel valve device.

Fig. 2 is a view partly in section showing a second modification of the valve device of Fig. 1.

Fig. 3 is a view partly in section showing still another modification of the valve device for use in Fig. 1.

Fig. 4 is a view partly in section showing still another modification of the valve device for use in Fig. 1.

Figs. 5 and 6 are views in plan and elevation, respectively, of a valve stop device, shown in the Figs. 2 and 3.

Figure 7:
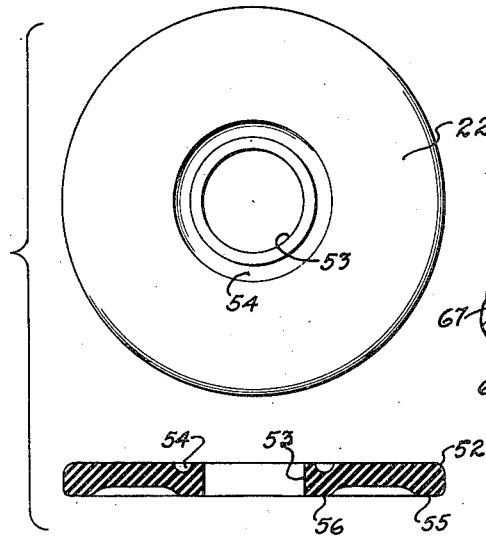
Fig. 7 is a top plan and vertical view showing a form of valve disk usable in the pump.

With respect to the pump assembly as shown in Fig. 1, the numeral 1 indicates the main casting of the pump comprising a flange 2 for attachment to the engine block (not shown). The main casting provides a housing for the rocker arm actuating device for the pump indicated by reference 3, pivoted near the flange on a bearing 4, for rocking movement imparted by the cam 5 on the camshaft 6 of the engine in one direction, and in the opposite, under the pressure of spring 7, positioned between the casting of the pump body and the outward end of the rocker arm 3. The opposite end of the rocker arm engages under a stack of suitable washers indicated as 8 mounted on the stem 9 of the pump and held in engagement therewith by the headed end 9a thereof. The stem in turn extends downwardly through a bell-shaped portion of the pump casting indicated as 10. In this portion is an oil seal device indicated generally as 11 surrounding the stem 9 and presesd into engagement with the shoulder 12 of the bell-shaped portion of the pump body casting 10 by compresion spring 13. The spring in turn engages at its opposite end on one of several superposed plain and cup shaped washers at opposite faces of the pump diaphragm 15. These washers are in turn held in place on the pump stem 9 between a shoulder 16 and a headed end 17 on the pump stem.

The bell-shaped portion of the pump casting attaches to an intermediate valve chamber casting indicated as 19 by screws 20 which secure the parts together and at the same time seal the diaphragm edges to the body of the pump.

The valve chamber casting includes an intake port indicated at 21 and a passage therefrom to intake valve 22 and outlet valve 22a, each of which is mounted on bridge members spanning the passages and provided with valve seats 23 for each of the valves. The valve seats are provided with a fluid port comprising a ring of passages 24. Within the periphery and centrally located with respect to these ports 24, is a valve stem receiving socket 25. Although not clearly shown in this particular figure of the drawing, the surface of each bridge member of valve seat 23 is slightly dished. This feature is shown in greater detail by the enlarged views of Fig. 2, etc. The flow of fluid through the ring of ports 24 for each valve seat is controlled by check valve devices 22 and 22a which comprise in each case an identical structure. For this reason the description is applicable to either. Each check valve device comprises a flexible synthetic rubber or plastic disk 26. The check valve disk 26 is in turn held yieldingly in place by a caging device or mushroom-shaped valve guiding and stop member which will now be specifically described.

The valve caging device comprises a guide stem at 28 snugly fitting the central hole of the valve disk 26 and formed integrally with a mushroom-shaped head including an outer lower edge forming a ring-shaped valve stop member 45 with integral supporting structure or struts 27 for supporting the valve stop 45 on the stem. Interposed between the mushroom-shaped head and the ring-shaped check valve 26 is a spring 29 for yieldingly urging the check valve member into conformity with its seat 23. The caging device is secured to the valve seat by its stem member alone. This hollow stem member may be provided with a tapered lower end frictionally anchored in place in a tapered socket 25 of the valve seat bridge member. The press fit causes deformation of the indentation in the closed end of the stem 30 which tends to expand the stem sides and aid in anchoring the stem in the socket. The amount of deformation is exaggerated in this view solely for the purpose of illustration. Actually, in assembly of the stem with the seat, a flat anvil is placed on the opposite side of the seat and the stem is pressed into the socket until its convex end engages and is slightly deformed by the anvil, thus expanding the stem and fixing the parts in place.

As more clearly shown in Fig. 2, for example, the ring-shaped check valve 26 is pressed into engagement at its inner and outer peripheries by spring 29 engaging adjacent one periphery of the valve and between the valve and the caging device. This is due to the fact that the lower surface of the valve is planar, while the dished seat is generally concave. The resistance of the valve to deformation by the seat is inherent, due to the resilient nature of the valve material, and this resistance to deformation seats the outer periphery of the valve disk. It should be clearly understood, however, that this improved type of seat may be used with either a planar lower seating surface on the valve disk or a concave lower seating surface on the valve disk.

In operation it can be readily understood that a check valve such as above described is capable at least of two separate and distinct actions, depending upon the volume of fluid entering through the ports 24 in the bridge valve seat portion of the casing. In cases where the volume is sufficiently large, the check valve member will accommodate and respond thereto by sliding upwardly on the stem member against the action of the spring until it strikes the stop of the caging device member. This depending edge of the caging device limits the amount of travel of the ring-shaped check valve so that the return action of the valve will be prompt and, because of the small distance necessary to close, and because of the progressive manner of closing, will be without serious impact on the valve seat, which has in the past given so much difficulty in the mechanical operation of pumps of this type. On the other hand, when the volume passing the check valve is small due to the back pressure against the pump diaphragm, the valve itself is of such construction that the disk will flex slightly upwardly at its outer edges and by-pass the small volume of fluid without the extreme travel necessary under situations required during priming of the pump and when large volumes are necessary. The dished upper surface of the bridge valve seat member 23 permits this action of the ring-shaped check valve and effects distortion of the valve during seating, which cushions its seating action.

The valve design above described facilitates the assembly of the pumps by production methods. The step of installing a valve for the pump in assembly requires merely the placing of the ring-shaped check valve disk on the stem, or in place on the bridge member, and then the forceable insertion of the stem of the mushroom-shaped caging device with its spring assembled into the socket 25 of the bridge member. Anchoring of the same in the bridge member will be automatic, due to the press fit.

Since the inlet valve 22 and outlet valve 22a are identical, the same reference characters have been applied to both.

The valve chamber casting is capped by an outlet casting 31 sealed to the valve chamber casting by a gasket 32 and attached in place by means not shown. This casting member includes a portion of the inlet passage 33 and outlet passage 34 with its corresponding outlet connection 35.

With reference to Fig. 2, a modification of the check valve of Fig. 1 is illustrated. It will be noted that the same reference characters have been applied to like parts in this and in subsequent figures to facilitate a clear understanding of the illustrations. In this figure the bridge member 23 is provided with a dished surface forming the valve seat which is in turn provided with a fluid port comprising a ring of fluid entry passages 24 and a centrally located hole or socket 25 in which the stem of the valve cage member generally indicated as 22 is pressed thereby providing a mounting for the valve cage member within the periphery of the valve port. The ring-shaped check valve 26 is identical with that of Fig. 1 and is mounted to cover the ring of fluid passage 24 to seal the port. The valve in turn is held in place by a cage device which is a mushroom-shaped valve mount provided with a center guide stem snugly fitting a central hole in the ring-shaped check valve 26. The guide stem is provided with a shoulder 38 and is pressed into the hole 25 in the bridge valve seat. The valve caging device or mount is generally indicated at 22 and comprises a mushroom-shaped mounting member having a ring-shaped valve stop 45 with integral struts 27 between the stop and the apertured central head portion 43, which is secured to the central guide stem 36 by a portion of the stem member spun over to form a head as shown at 37. Between the stop and the ring-shaped check valve is mounted a spring 29 which presses the valve disk into seating engagement with the seat at both its inner and outer peripheries. The operation of the valve of Fig. 2 is identical with that of Fig. 1.

Fig. 3 shows still a third modification of the check valve structure 22 usable in the pump as shown in Figure 1. A bridge-shaped check valve seat is indicated by the reference character 23, and is provided with a dished upper surface or seating surface as above described in the other modifications. In this modification the ring-shaped check valve 26 is held on the seat by means of a mushroom-shaped valve guiding and stop member similar in design to that above described in Fig. 2, and indicated by the same reference character 27. The only difference between this check valve amount and the one above described is that in Fig. 3 the central stem portion 40 of the mushroom-shaped valve mount is cast integrally with the bridge valve seat indicated at 23. The valve stop member 45 is mounted on this integral cast stem, in a similar manner as above described. The stem is provided with a reduced portion at its outer end over which the stop member is fitted and the upper end of the stem is headed over, or spun over, as shown in 41 to hold the stop means in place. The spring 29 is interposed between the stop and the ring-shaped check valve itself.

Fig. 4 shows still another modification of a check valve device suitable for use in the pump of Fig. 1. In this modification the bridge valve seat member 23 is concave as in the above mentioned designs, and receives thereon the rubber ring-shaped check valve 26 overlapping and closing the ports 24 which are fluid passages in the bridge valve seat member. The disk valve is held in place in this modification by a mushroom-shaped valve guiding and stop member generally indicated at 22, differing slightly in some respects from that above described. The stem 42 of the valve mount is formed of pressed metal and is hollow as shown in this figure and in Fig. 1, and provided with a convex lower closed end indicated at 44. The bridge valve seat is formed with a corresponding socket to receive this portion of the stem and is provided with a slight taper. The coacting part of the stem is formed with a like taper and is pressed into place. The upper end of the stem is provided with a rolled portion 43 forming a head and strut members 27 extend downwardly and outwardly to a ring-shaped valve stop member 45 provided with an upwardly rolled outer edge. A spring 29 is interposed between the upper rolled edge of the head 43 and the ring-shaped check valve member 26, pressing the valve disk into seating engagement with the seat at both its inner and outer peripheries. The operation of this check valve is identical with that above explained.

Figs. 5 and 6 show the mushroom head separately, which is used on the stems shown in the previous views, Fig. 2 and 3. In each case the head comprises a ring-shaped central portion 50 with outwardly and downwardly extending curved legs 46 having straight portions 48 joining with oppositely curved portions 49, integral with the outer flat ring 45 forming the valve stop concentric with the ring-shaped center portion, but because of the shape of the legs, necessarily located in offset relation. The particular head indicated in Figs. 5 and 6 is used specifically in Figs. 2 and 3 and differs from the modification illustrated by Figs. 1 and 4, wherein the head member is formed integrally with the stem. A central aperture 47 is provided whereby the stem may be secured by a spun head as illustrated at 37 and 41 holding the valve stop member in place.

The skeleton configuration of the mushroom-shaped head is similar for each of the above described modifications, and is not an arbitrary choice or design, since it performs a distinct function in combination with the ring disk valve. The openings permit the pulsations of the fluid created by the pump to act directly on the face of the valve and thereby effect its closing action independently of the spring 29.

In Fig. 7 is illustrated a modified form of valve disk which may be used interchangeably with the valve disk 26. It has been discovered that the valve disk of Fig. 7 is far superior to the form in the previous illustrations both as to sealing qualities and flow capacity. As shown valve disk 22a is a circular ring shaped rubber or plastic disk formed with a rounded outer peripheral edge 52 and a central aperture 53 which is adapted to snugly encircle the stem of a valve caging member or the like. On the upper plain surface of the disk is formed a circular recess 54 concentric with the aperture and adapted to seat a valve disk spring. The opposite surface is formed with two concentric beads 55 and 56 adjacent the outer and inner ring peripheries respectively.

Figure 8:
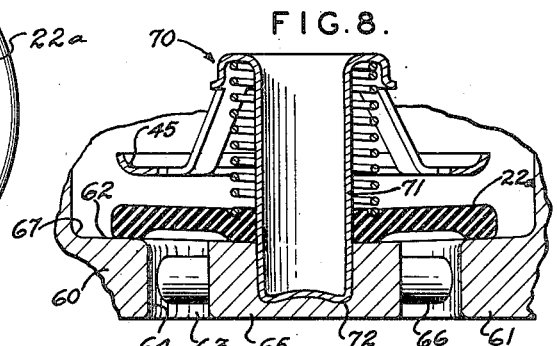
Fig. 8 is a fragmentary vertical sectional view of the valve assembled on its seat.

In Fig. 8 is illustrated a modification including the valve disk 22a together with a form of valve seat porting which has shown by test to increase the volumetric efficiency of the pump illustrated. The valve chamber casting 60 is formed with a pair of identical bridging members 61, one of which is shown, forming a support for either the intake or exhaust valves. It should be understood that the bridging members have valve seats 62 facing in opposite directions as illustrated in Fig. 1. Because of this similarity in construction, only one will be described. In the bridging member 61 and within the periphery of the valve disk 22a is a valve port 63 formed between the inner walls of a cylindrical opening 64 in the bridge member and the outer walls of a cylindrical support 65 for the stem 71 of the mushroomed-shaped valve caging member generally indicated at 70. The support 65 is held in spaced relation with respect to the main part of the bridging member preferably by three streamlined struts 66 of approximately eliptical cross section.

The valve seat 62 formed in part on the upper surface of the main part of the bridge 61 and in part on the upper surface of the strut-supported part of the bridge 65 is slightly dished or concave as has been previously explained. As here illustrated the edges between the seat and the port and the entrance edges to the port are rounded to facilitate a streamlined flow into and out of the port. It is also pointed out that a fillet 67 is provided at the juncture between the bridging member and the walls forming the recess for the valve seat in the valve chamber casting 60.

When the valve lifts against the valve stop member 45 a passage is formed through the port, and between the bottom and edges of the valve disk and the opposed surfaces of the seat and walls of the recess, which is smoothly curved at its stream boundaries thus providing cooperating structures with continuously smooth contour and flow area from entrance to exit of the valve with minimum valve travel.

A socket 72 having 1° of "Morse Taper" is formed in the portion of the bridging member 65 which has a convex bottom in the center and is generally described as having a cross sectional contour undulantly curved. The valve stop is of the type previously described and illustrated in Fig. 4 and has a hollow stem 71 with a convex end as therein shown and described. Fig. 8 illustrates the stem pressed into the socket 72 and Fig. 9 illustrates one way of assembling valve, valve stop, spring and seat.

In this figure, the valve disk is dropped onto the seat and then the valve caging member with spring in place is brought into registering relation with the valve disk aperture and the socket 72. A mandrel 80 is inserted into the hollow stem 71 which mandrel has an end 81 complementary in shape with the contour of the socket. The mandrel is forced into the socket thereby deforming the end of the stem from a convex contour to one conforming with the bottom of the socket (see Fig. 8). The mandrel end, and the socket 72 are so shaped that the center portion of the end of the stem 71 is sprung slightly past a dead center position with respect to the circular line of juncture between the cylindrical stem and its end wall, thus locking the stem in the socket.

Figure 9:
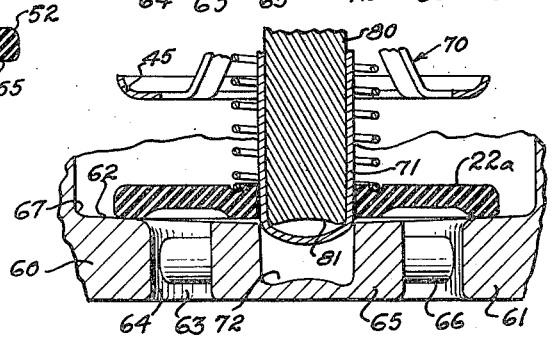
Fig. 9 is a fragmentary vertical sectional view illustrating the manner of assembling the device of Fig. 8.

With this exception the valve stop members or caging devices of Figs. 8 and 9 are the same as that of Fig. 4, and it is contemplated that this manner of locking the stem in the socket may be applied to the modification of Fig. 1 wherein the socket extends through the bridge member. This could readily be done by placing an anvil below the socket, which could be planar or contoured as shown at 72.

Figure 10:
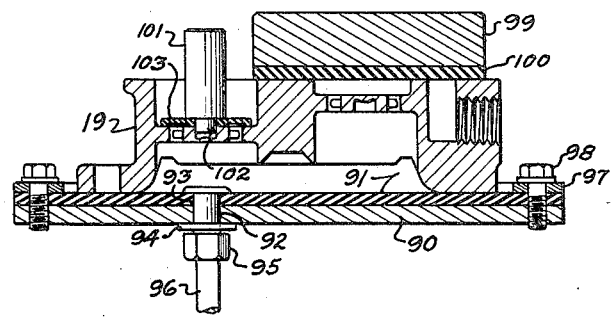
Fig. 10 is a vertical sectional view illustrating a test of the seal between valve and seat.

Now turning to Fig. 10, a method and apparatus is disclosed for testing the seal between a valve disk and its seat are illustrated.

The testing device is a flat plate 90 with an upper surface of soft gasket material 91 fastened in place on the plate by a metal ring 97 secured by capscrews 98 threaded into the plate 90. Both plate 90 and its gasket material 91 are formed with registering holes 92 and 93 in which is sealed a stem 94 connected to a source of suction, not shown, by a pipe 96 and a threaded coupling 95.

The valve casting 19 is placed one face down on the gasket 91 and one of the valve ports is sealed off by a plate 99 with gasket 100 on its lower surface placed over the entrance to the one of the valve ports. A valve disk 103 of one of the kind illustrated is dropped onto its seat and a weight 101 equal to spring tension is placed on the valve disk. This weight preferably is formed with a shoulder resting on the disk and a stem 102 projecting into the hole or socket in the bridge of the valve chamber casting.

Suction can now be applied through pipe 96 to test valve 103 and its seat for leakage since all other openings in the casting are closed. After the suction is once applied it is then cut off and any noticeable leakage between the valve and seat can be readily detected on a vacuum gauge.

Of course to test the other seat it is only necessary to reverse the valve chamber casting position on plate 90 so that the other valve chamber is subject to suction, drop a valve to be tested onto its seat, and the weight onto the valve disk. If no leakage is detected then the weight is removed and the valve caging device pressed into the socket or spun onto the stem as the case may be. The detail construction of the valves, caging devices, valve seats, and valve chamber casting produces an overall design which permits quantity production of all the parts together with testing before assembly, and easy and quick assembly after the test.

One of the outstanding advantages of this design is the obvious saving of time, money and materials due to leaky valves which would normally not be apparent until the final test of the completed pump. Since the usual pump failure on final test is due almost entirely to faulty valve action or seating, a preliminary test of these parts as described before assembly of the whole pump eliminates the number of rejects. If, as here, a design could be discovered in which the valves might be tested even before they are assembled and a substitution made, the possibility of added savings in overall cost are increased, since disassembly steps are eliminated.

I claim:

In a check valve, a wall having a valve seat, a port and a socket, a cage member comprising a hollow stem having a closed end for complementary engagement in said socket, the opposite end of said hollow stem being flared outwardly and downwardly to form a continuous ring-shaped spring seat of channel section, apertured support structure depending downwardly and outwardly from the lower edge portion of said ring-shaped spring seat, an annular valve stop member coaxial with said stem, said stop member having a flat main body portion and an outer upwardly flared marginal edge portion, said support structure being connected at its lower edge to the inner edge of the flat body portion of said stop member, said stem, channel section, support structure and stop being a single one-piece sheet metal member, a ring-shaped disc valve slidably mounted on the stem between said valve seat and valve stop, a helical compression spring encircling said stem, said spring having its upper end portion seated in said ring-shaped spring seat and its lower end engaging said valve to urge the latter against the valve seat to close said port.

References Cited in the file of this patent

UNITED STATES PATENTS

| | | |
|---|---|---|
| 157,791 | Cameron | Dec. 15, 1874 |
| 198,071 | Blake | Dec. 11, 1877 |
| 1,659,343 | Whitehead | Feb. 14, 1928 |
| 1,669,361 | Tuttle | May 8, 1928 |
| 1,734,288 | Davis | Nov. 5, 1929 |
| 1,742,044 | Meldrum | Dec. 31, 1929 |
| 1,928,836 | Loughead | Oct. 3, 1933 |
| 1,967,418 | McPhail | July 24, 1934 |
| 2,090,486 | Richardson | Aug. 17, 1937 |
| 2,110,107 | Drysdale | Mar. 1, 1938 |
| 2,117,504 | Richardson | May 17, 1938 |
| 2,576,637 | Patriquin | Nov. 27, 1951 |

FOREIGN PATENTS

| | | |
|---|---|---|
| 27,992 | Switzerland | of 1903 |
| 677,977 | France | of 1929 |